US012452890B2

(12) United States Patent
Huang et al.

(10) Patent No.: US 12,452,890 B2
(45) Date of Patent: Oct. 21, 2025

(54) INDICATION OF TRANSMISSION CONFIGURATION INDICATOR STATE SWITCHING ACROSS REMOTE RADIO HEADS

(71) Applicant: QUALCOMM Incorporated, San Diego, CA (US)

(72) Inventors: Chu-Hsiang Huang, San Diego, CA (US); Hari Sankar, San Diego, CA (US); Pierpaolo Vallese, Nuremberg (DE); Jae Ho Ryu, San Diego, CA (US); Changhwan Park, San Diego, CA (US); Paolo Minero, La Jolla, CA (US); Gaurav Nigam, Millburn, NJ (US); Jae Won Yoo, San Diego, CA (US); Peter Zillmann, Nuremberg (DE); Carlos Cabrera Mercader, Cardiff, CA (US)

(73) Assignee: QUALCOMM Incorporated, San Diego, CA (US)

( * ) Notice: Subject to any disclaimer, the term of this patent is extended or adjusted under 35 U.S.C. 154(b) by 422 days.

(21) Appl. No.: 17/811,755

(22) Filed: Jul. 11, 2022

(65) Prior Publication Data
US 2023/0131322 A1 Apr. 27, 2023

Related U.S. Application Data

(60) Provisional application No. 63/262,836, filed on Oct. 21, 2021.

(51) Int. Cl.
*H04W 72/51* (2023.01)
*H04W 24/10* (2009.01)
*H04W 64/00* (2009.01)

(52) U.S. Cl.
CPC ........... *H04W 72/51* (2023.01); *H04W 24/10* (2013.01); *H04W 64/00* (2013.01)

(58) Field of Classification Search
CPC ......... H04W 72/1263; H04W 72/0453; H04W 24/10; H04W 56/001; H04W 72/541;
(Continued)

(56) References Cited

U.S. PATENT DOCUMENTS 10,281,939 B2 * 5/2019 Chamberlain ......... G01R 27/16
11,044,581 B2 * 6/2021 Manolakos ............. G01S 19/48
(Continued)

FOREIGN PATENT DOCUMENTS

CN 114424660 A * 4/2022 ............ H04W 72/53
CN 114731223 A * 7/2022 ........ H04W 74/0816
(Continued)

OTHER PUBLICATIONS

Q. Li, J. -C. Sibel, M. Berbineau, I. Dayoub, F. Gallée and H. Bonneville, "Physical Layer Enhancement for Next-Generation Railway Communication Systems," in IEEE Access, vol. 10, pp. 83152-83175, 2022, doi: 10.1109/ACCESS.2022.3192971 (Year: 2022).*

(Continued)

*Primary Examiner* — William D Cumming
(74) *Attorney, Agent, or Firm* — Harrity & Harrity, LLP

(57) ABSTRACT

In some aspects, a user equipment (UE) may receive a message that includes an indication that a transmission configuration indicator (TCI) state switch for the UE is to be across a serving remote radio head (RRH) and a next RRH. The UE may adjust a tracking of the UE with respect to the serving RRH and the next RRH based at least in part on the indication. Numerous other aspects are described.

30 Claims, 11 Drawing Sheets

(58) Field of Classification Search
CPC ..... H04W 88/14; H04W 4/025; H04W 76/28; H04W 24/08
USPC .......................................... 370/10, 329, 503
See application file for complete search history.

(56) References Cited

U.S. PATENT DOCUMENTS

| | | | |
|---|---|---|---|
| 11,356,229 B2* | 6/2022 | Jeon | H04W 24/08 |
| 11,405,166 B2* | 8/2022 | Zhou | H04W 24/08 |
| 11,553,500 B2* | 1/2023 | Chendamarai Kannan | H04L 5/0073 |
| 11,617,192 B2* | 3/2023 | Chendamarai Kannan | H04W 88/14 370/329 |
| 11,641,224 B2* | 5/2023 | Rahman | H04B 7/0456 375/262 |
| 11,743,848 B2* | 8/2023 | Lei | H04W 24/10 370/503 |
| 11,799,616 B2* | 10/2023 | Zhou | H04W 76/28 |
| 11,811,706 B2* | 11/2023 | Jeon | H04W 72/23 |
| 2020/0236507 A1* | 7/2020 | Manolakos | H04W 4/025 |
| 2020/0374079 A1 | 11/2020 | Chervyakov et al. | |
| 2021/0100006 A1* | 4/2021 | Chendamarai Kannan | H04W 56/001 |
| 2021/0100017 A1* | 4/2021 | Chendamarai Kannan | H04W 72/541 |
| 2021/0167930 A1* | 6/2021 | Jeon | H04L 5/0098 |
| 2021/0243734 A1 | 8/2021 | Zhang et al. | |
| 2021/0336750 A1* | 10/2021 | Zhou | H04W 76/28 |
| 2022/0022147 A1* | 1/2022 | Lei | H04W 72/0453 |
| 2022/0200666 A1* | 6/2022 | Lee | H04B 7/024 |
| 2022/0200670 A1* | 6/2022 | Rahman | H04B 7/0478 |
| 2022/0256315 A1* | 8/2022 | Lei | H04W 72/1263 |
| 2022/0294595 A1* | 9/2022 | Jeon | H04W 24/08 |
| 2022/0353938 A1* | 11/2022 | Siomina | H04L 1/1812 |
| 2022/0368508 A1* | 11/2022 | Zhou | H04L 5/0092 |
| 2023/0037644 A1* | 2/2023 | Huang | H04W 72/51 |
| 2023/0131322 A1* | 4/2023 | Huang | H04B 7/022 370/329 |
| 2023/0268979 A1* | 8/2023 | Dalsgaard | H04W 8/22 370/329 |
| 2024/0072979 A1* | 2/2024 | Jeon | H04W 72/23 |

FOREIGN PATENT DOCUMENTS

| | | | | |
|---|---|---|---|---|
| CN | 114731223 B | * | 12/2024 | ........ H04W 74/0816 |
| EP | 4038780 B1 | * | 4/2024 | ........... H04L 1/1838 |
| JP | 2022551082 A | * | 12/2022 | ........... H04L 1/1812 |
| JP | 7377966 B2 | * | 11/2023 | ........... H04L 1/1838 |
| WO | WO-2021064670 A1 | * | 4/2021 | ........... H04W 76/30 |
| WO | WO-2021067253 A1 | * | 4/2021 | ........... H04W 72/23 |
| WO | WO-2021067364 A1 | * | 4/2021 | ........... H04W 72/53 |
| WO | WO-2021157035 A1 | | 8/2021 | |
| WO | WO-2021163508 A1 | | 8/2021 | |
| WO | WO-2023069829 A1 | * | 4/2023 | ........... H04B 7/0617 |

OTHER PUBLICATIONS

International Search Report and Written Opinion—PCT/US2022/077164—ISA/EPO—Dec. 14, 2022.
SAMSUNG: "Enhancements on Multi-TRP Inter-Cell Operation", 3GPP TSG RAN WG1 #103, R1-2008150, 3rd Generation Partnership Project, Mobile Competence Centre, 650, Route Des Lucioles, F-06921 Sophia-Antipolis Cedex, France, vol. RAN WG1, No. e-Meeting, Oct. 26-Nov. 13, 2020, Oct. 23, 2020, XP051945333, 3 Pages, the whole document.

* cited by examiner

INDICATION OF TRANSMISSION CONFIGURATION INDICATOR STATE SWITCHING ACROSS REMOTE RADIO HEADS

CROSS-REFERENCE TO RELATED APPLICATION

This patent application claims priority to U.S. Provisional Patent Application No. 63/262,836, filed on Oct. 21, 2021, entitled "INDICATION OF TRANSMISSION CONFIGURATION INDICATOR STATE SWITCHING ACROSS REMOTE RADIO HEADS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for an indication of transmission configuration indicator state switching with remote radio heads.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a message that includes an indication that a transmission configuration indicator (TCI) state switch for the UE is to be across a serving remote radio head (RRH) and a next RRH. The method may include adjusting a tracking of the UE with respect to the serving RRH and the next RRH based at least in part on the indication.

Some aspects described herein relate to a method of wireless communication performed by a network entity. The method may include generating an indication that a TCI switch for a UE is across a serving RRH associated with the network entity and a next RRH associated with the network entity. The method may include transmitting the indication to the UE in a message.

Some aspects described herein relate to a UE for wireless communication. The UE may include a memory and one or more processors coupled to the memory. The one or more processors may be configured to receive a message that includes an indication that a TCI state switch for the UE is to be across a serving RRH and a next RRH. The one or more processors may be configured to adjust a tracking of the UE with respect to the serving RRH and the next RRH based at least in part on the indication.

Some aspects described herein relate to a network entity for wireless communication. The network entity may include a memory and one or more processors coupled to the memory. The one or more processors may be configured to generate an indication that a TCI switch for a UE is across a serving RRH associated with the network entity and a next RRH associated with the network entity. The one or more processors may be configured to transmit the indication to the UE in a message.

Some aspects described herein relate to a non-transitory computer-readable medium that stores a set of instructions for wireless communication by a UE. The set of instructions, when executed by one or more processors of the UE, may cause the UE to receive a message that includes an indication that a TCI state switch for the UE is to be across a serving RRH and a next RRH. The set of instructions, when executed by one or more processors of the UE, may cause the UE to adjust a tracking of the UE with respect to the serving RRH and the next RRH based at least in part on the indication.

Some aspects described herein relate to a non-transitory computer-readable medium that stores a set of instructions for wireless communication by a network entity. The set of instructions, when executed by one or more processors of the network entity, may cause the network entity to generate an indication that a TCI switch for a UE is across a serving RRH associated with the network entity and a next RRH associated with the network entity. The set of instructions, when executed by one or more processors of the network entity, may cause the network entity to transmit the indication to the UE in a message.

Some aspects described herein relate to an apparatus for wireless communication. The apparatus may include means for receiving a message that includes an indication that a TCI state switch for the apparatus is to be across a serving RRH and a next RRH. The apparatus may include means for adjusting a tracking of the apparatus with respect to the serving RRH and the next RRH based at least in part on the indication.

Some aspects described herein relate to an apparatus for wireless communication. The apparatus may include means for generating an indication that a TCI switch for a UE is across a serving RRH associated with the apparatus and a next RRH associated with the apparatus. The apparatus may include means for transmitting the indication to the UE in a message.

Aspects generally include a method, apparatus, system, computer program product, non-transitory computer-readable medium, user equipment, base station, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
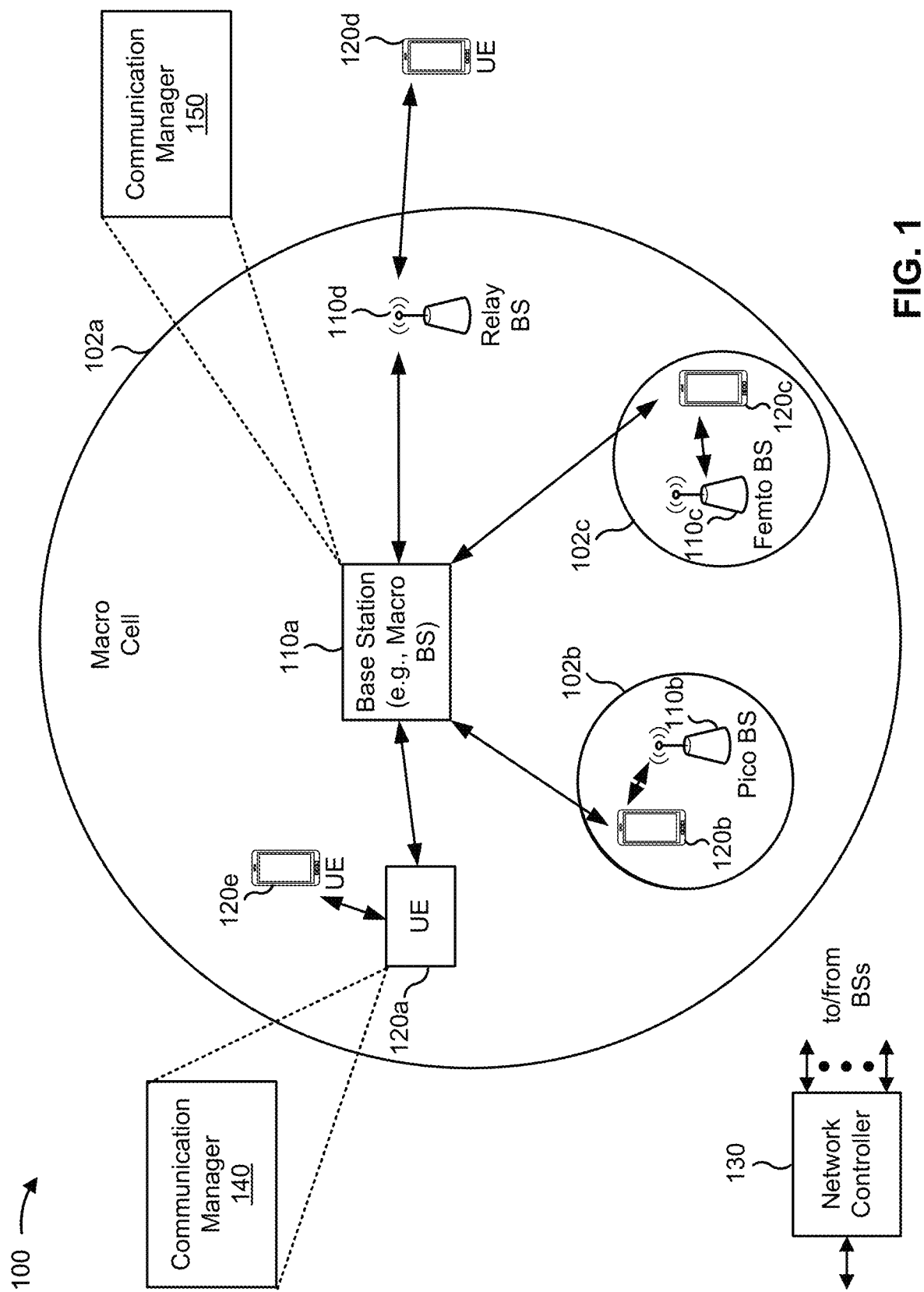
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a message that includes an indication that a transmission configuration indicator (TCI) state switch for the UE is to be across a serving remote radio head (RRH) and a next RRH. The communication manager 140 may adjust a tracking of the UE with respect to the serving RRH and the next RRH based at least in part on the indication. Additionally, or alternatively, the communication manager 140 may perform one or more other operations described herein.

In some aspects, a network entity (e.g., base station 110) may include a communication manager 150. As described in more detail elsewhere herein, the communication manager 150 may generate an indication that a TCI switch for a UE is across a serving RRH associated with the network entity and a next RRH associated with the network entity. The communication manager 150 may transmit the indication to the UE in a message. Additionally, or alternatively, the communication manager 150 may perform one or more other operations described herein.

As indicated above, FIG. 1 is provided as an example. Other examples may differ from what is described with regard to FIG. 1.

Figure 2:
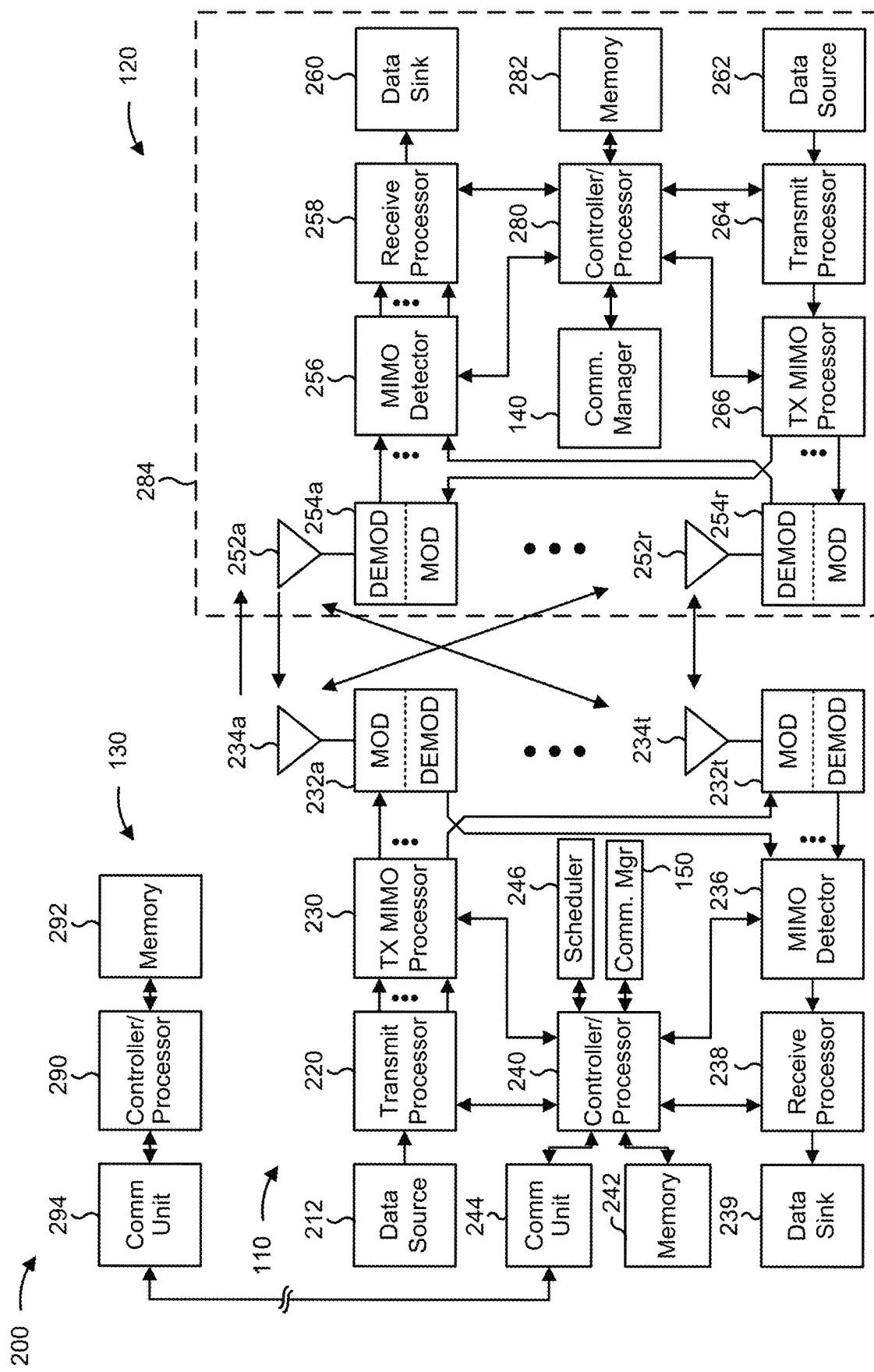
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-11).

The controller/processor 240 of a network entity (e.g., base station 110), the controller/processor 280 of the UE 120, and/or any other component(s) of FIG. 2 may perform one or more techniques associated with indicating a TCI state switch with RRHs, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for receiving a message that includes an indication that a TCI state switch for the UE 120 is to be across a serving RRH and a next RRH; and/or means for adjusting a tracking of the UE 120 with respect to the serving RRH and the next RRH based at least in part on the indication. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., base station 110) includes means for generating an indication that a TCI switch for a UE is across a serving RRH associated with the base station 110 and a next RRH associated with the base station 110; and/or means for transmitting the indication to the UE in a message. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
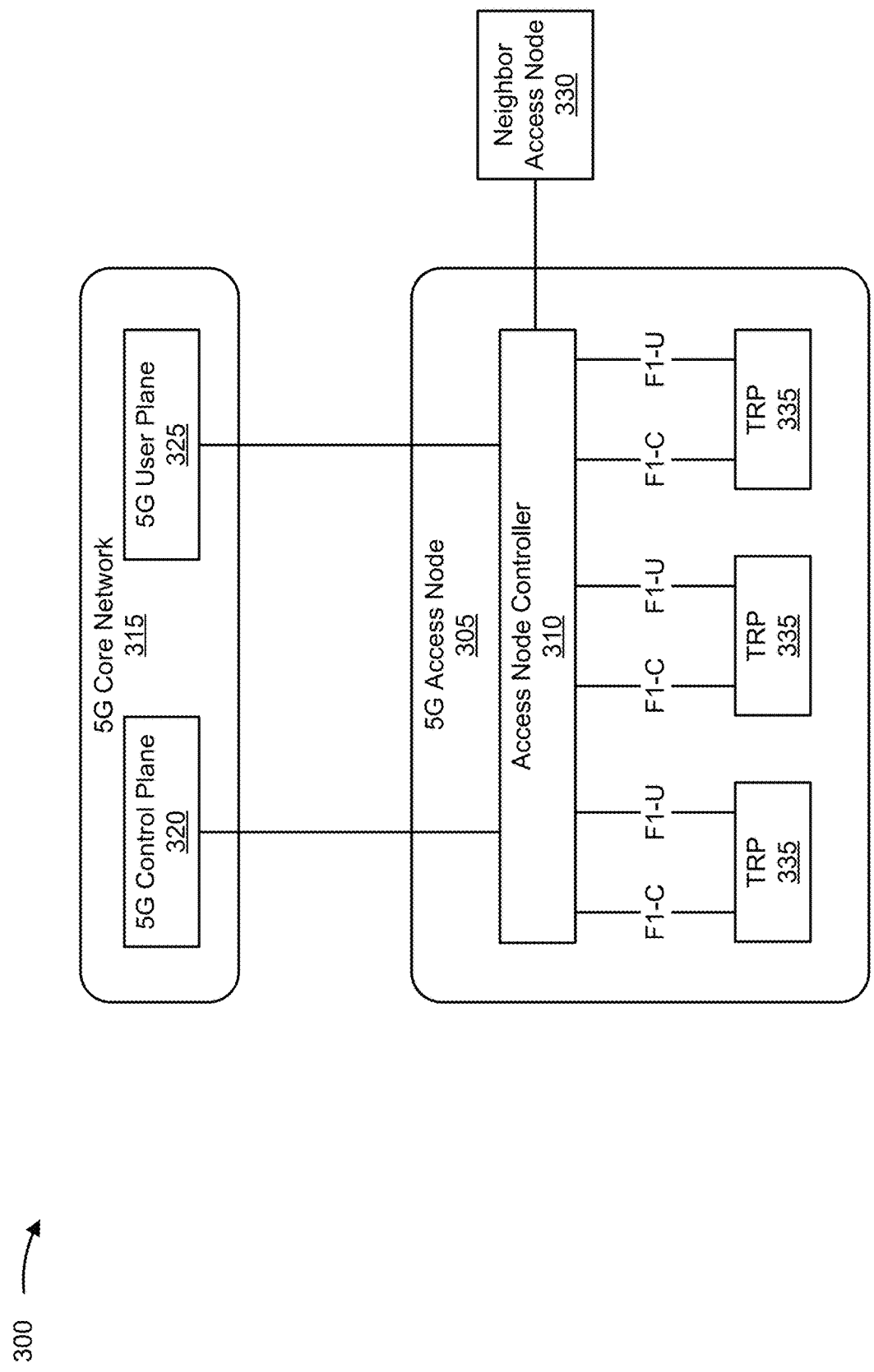
FIG. 3 illustrates an example logical architecture of a distributed radio access network (RAN), according to aspects of the present disclosure.

FIG. 3 illustrates an example logical architecture of a distributed radio access network (RAN) 300, according to aspects of the present disclosure.

A 5G access node 305 may include an access node controller 310. The access node controller 310 may be a CU of the distributed RAN 300. In some aspects, a backhaul interface to a 5G core network 315 may terminate at the access node controller 310. The 5G core network 315 may include a 5G control plane component 320 and a 5G user plane component 325 (e.g., a 5G gateway), and the backhaul interface for one or both of the 5G control plane and the 5G user plane may terminate at the access node controller 310. Additionally, or alternatively, a backhaul interface to one or more neighbor access nodes 330 (e.g., another 5G access node 305, an LTE access node, and/or the like) may terminate at access node controller 310.

Access node controller 310 may include and/or may communicate with one or more TRPs 335 (e.g., via an F1 Control (F1-C) interface and/or an F1 User (F1-U) interface). A TRP 335 may be a DU of distributed RAN 300. In some aspects, a TRP 335 may correspond to a base station 110 described above in connection with FIG. 1. For example, different TRPs 335 may be included in different base stations 110. Additionally, or alternatively, multiple TRPs 335 may be included in a single base station 110. In some aspects, a base station 110 may include a CU (e.g., access node controller 310) and/or one or more DUs (e.g., one or more TRPs 335). In some cases, a TRP 335 may be referred to as a cell, a panel, an antenna array, an array, or an RRH.

A TRP 335 may be connected to a single access node controller 310 or to multiple access node controllers 310. In some aspects, a dynamic configuration of split logical functions may be present within the architecture of distributed RAN 300. For example, a packet data convergence protocol (PDCP) layer, a radio link control (RLC) layer, and/or a medium access control (MAC) layer may be configured to terminate at the access node controller 310 or at a TRP 335. A TRP 335 may be configured to individually (e.g., using dynamic selection) or jointly (e.g., using joint transmission with one or more other TRPs 335) serve traffic to a UE 120.

In some aspects, multiple TRPs 335 may transmit communications (e.g., the same communication or different communications) in the same transmission time interval (TTI) (e.g., a slot, a mini-slot, a subframe, a symbol) or different TTIs using different quasi-co-location (QCL) relationships (e.g., different spatial parameters, different TCI states, different precoding parameters, different beamforming parameters). A TCI state may indicate a directionality or a characteristic of a downlink beam, such as one or more QCL properties of the downlink beam. A QCL property may include, for example, a Doppler shift, a Doppler spread, an average delay, a delay spread, or spatial receive parameters, among other examples. In some aspects, a TCI state may be used to indicate one or more QCL relationships.

In some examples, each transmit beam from a TRP or RRH of the base station 110 may be associated with a synchronization signal block (SSB), and the UE 120 may indicate a preferred transmit beam by transmitting uplink transmissions in resources of the SSB that are associated with the preferred transmit beam. A particular SSB may have an associated TCI state (for example, for an antenna port or for beamforming). The base station 110 may, in some examples, indicate a downlink transmit beam based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam at the UE 120. Thus, the UE 120 may select a corresponding UE receive beam from a set of beam pair links based at least in part on the base station 110 indicating a transmit beam via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a physical downlink shared channel (PDSCH). The set of activated TCI states for downlink control channel communications may correspond to beams that the base station 110 may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of a TRP or RRH of the base station 110 using a directional UE transmit beam, and the TRP or RRH may receive the transmission using a directional base station receive beam. Each UE transmit beam may have an associated beam identifier (ID), beam direction, or beam symbols, among other examples. The UE 120 may transmit uplink communications via one or more UE transmit beams.

As indicated above, FIG. 3 is provided as an example. Other examples may differ from what was described with regard to FIG. 3.

Figure 4:
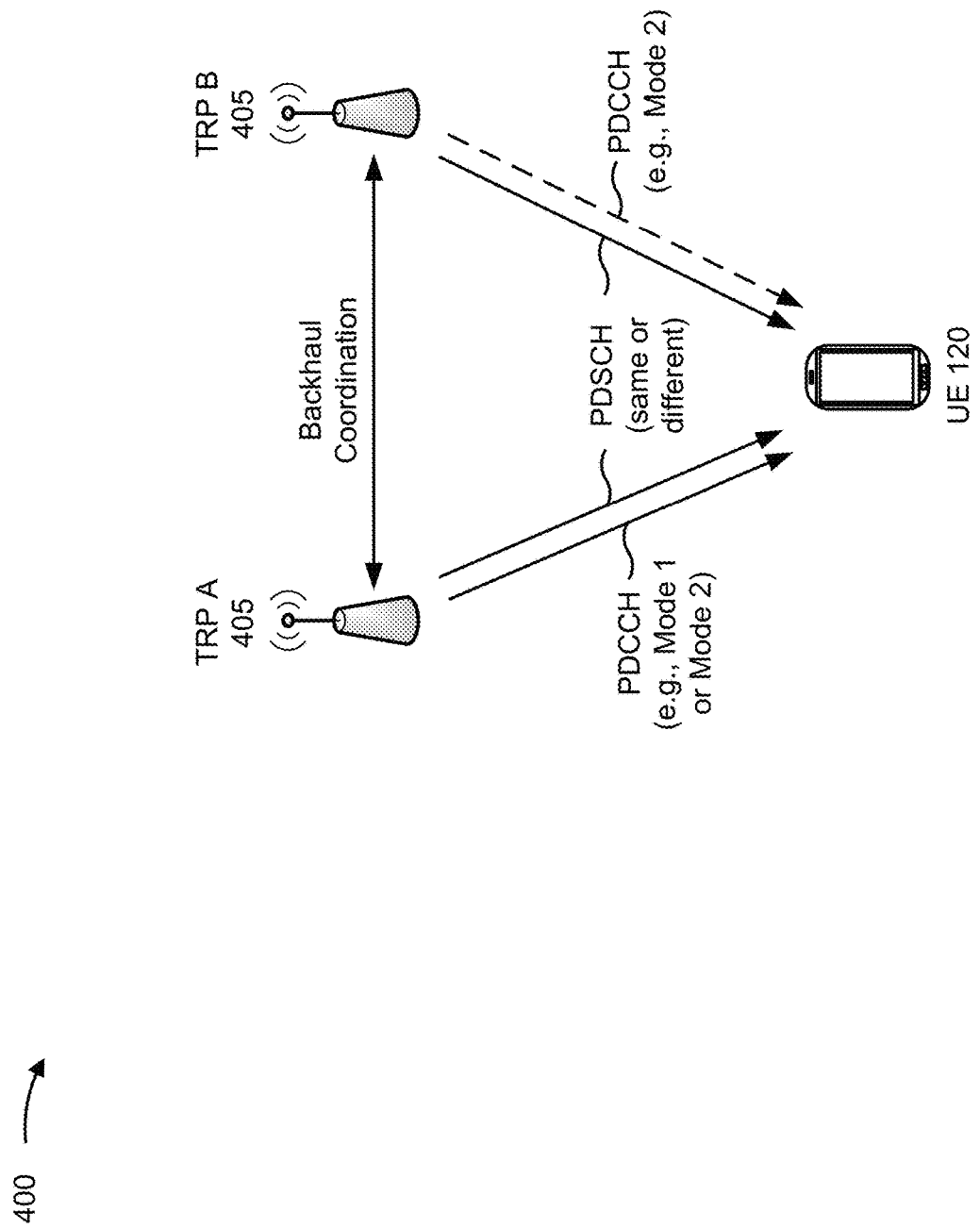
FIG. 4 is a diagram illustrating an example of multiple transmit receive point communication, in accordance with the present disclosure.

FIG. 4 is a diagram illustrating an example 400 of multi-TRP communication (sometimes referred to as multi-panel communication), in accordance with the present disclosure. As shown in FIG. 4, multiple TRPs 405 may communicate with the same UE 120. A TRP 405 may correspond to a TRP 335 described above in connection with FIG. 3.

The multiple TRPs 405 (shown as TRP A and TRP B) may communicate with the same UE 120 in a coordinated manner (e.g., using coordinated multipoint transmissions and/or the like) to improve reliability, increase throughput, and/or the like. TRPs 405 may coordinate such communications via an interface between TRPs 405 (e.g., a backhaul interface, an access node controller 310). The interface may have a smaller delay and/or higher capacity when TRPs 405 are co-located at the same base station 110 (e.g., when TRPs 405 are different antenna arrays or panels of the same base station 110) and may have a larger delay and/or lower capacity (as compared to co-location) when TRPs 405 are located at different base stations 110. The different TRPs 405 may communicate with UE 120 using different QCL relationships (e.g., different TCI states), different DMRS ports, and/or different layers (e.g., of a multi-layer communication).

In a first multi-TRP transmission mode (e.g., Mode 1), a single PDCCH may be used to schedule downlink data communications for a single PDSCH. In this case, multiple TRPs 405 (e.g., TRP A and TRP B) may transmit communications to UE 120 on the same PDSCH. For example, a communication may be transmitted using a single codeword with different spatial layers for different TRPs 405 (e.g., where one codeword maps to a first set of layers transmitted by a first TRP 405 and maps to a second set of layers transmitted by a second TRP 405). As another example, a communication may be transmitted using multiple codewords, where different codewords are transmitted by different TRPs 405 (e.g., using different sets of layers). In either case, different TRPs 405 may use different QCL relationships (e.g., different TCI states) for different DMRS ports corresponding to different layers. For example, a first TRP 405 may use a first QCL relationship or a first TCI state for a first set of DMRS ports corresponding to a first set of layers, and a second TRP 405 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0, DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 405, and a second PDCCH may schedule a second codeword to be transmitted by a second TRP 405. Furthermore, first DCI (e.g., transmitted by the first TRP 405) may schedule a first PDSCH communication associated with a first set of DMRS ports with a first QCL relationship (e.g., indicated by a first TCI state) for the first TRP 405, and second DCI (e.g., transmitted by the second TRP 405) may schedule a second PDSCH communication associated with a second set of DMRS ports with a second QCL relationship (e.g., indicated by a second TCI state) for the second TRP 405. In this case, DCI (e.g., having DCI format 1_0, DCI format 1_1) may indicate a corresponding TCI state for a TRP 405 corresponding to the DCI. The TCI field of a DCI indicates the corresponding TCI state (e.g., the TCI field of the first DCI indicates the first TCI state and the TCI field of the second DCI indicates the second TCI state). Multi-TRP systems may be deployed for high speed train (HST) scenarios, where multiple TRPs (RRHs) are deployed alongside a track on which the HST travels.

As indicated above, FIG. 4 is provided as an example. Other examples may differ from what is described with respect to FIG. 4.

Figure 5:
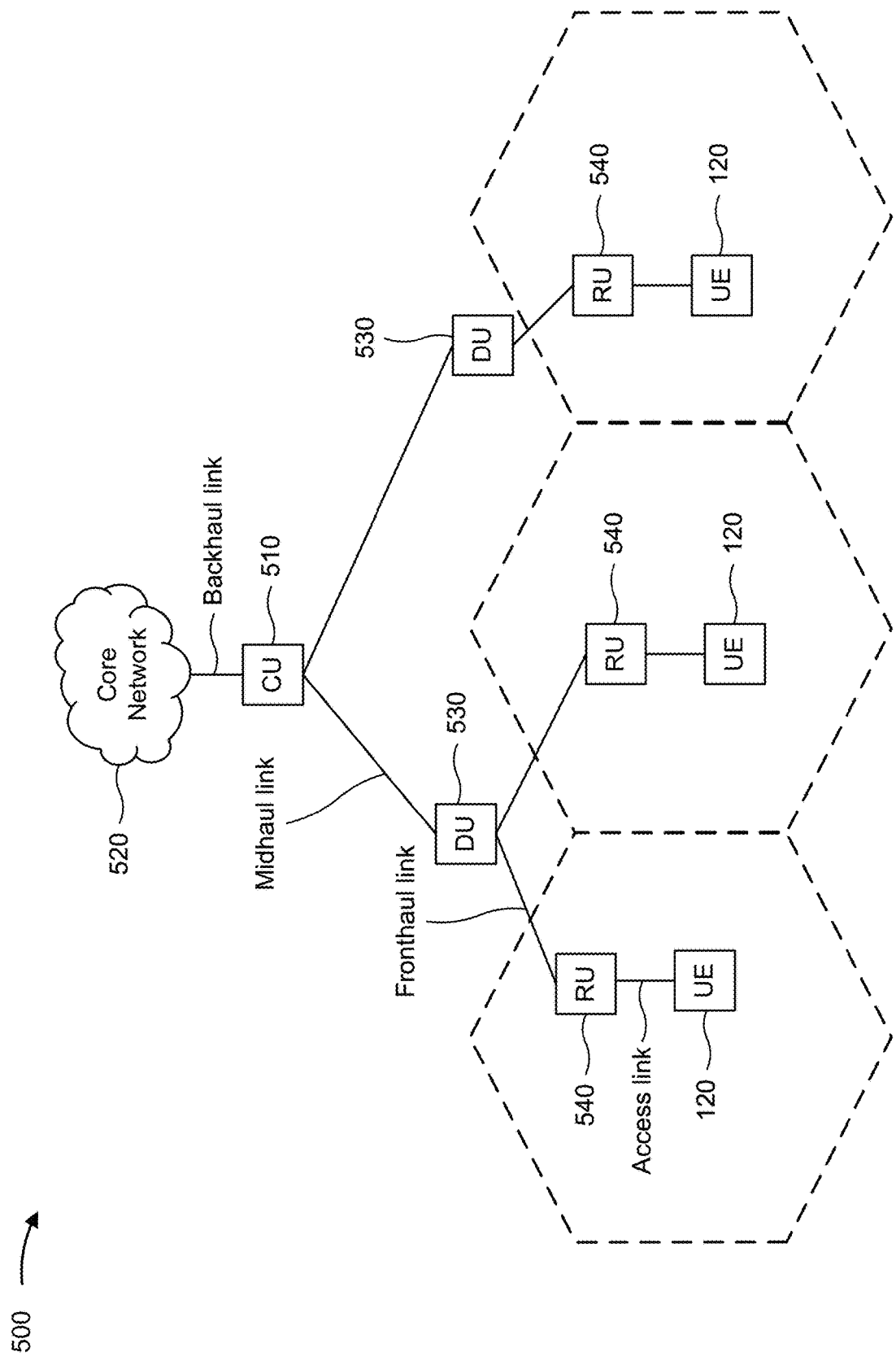
FIG. 5 is a diagram illustrating an example of an open RAN architecture, in accordance with the present disclosure.

FIG. 5 is a diagram illustrating an example 500 of an open RAN (O-RAN) architecture, in accordance with the present disclosure. As shown in FIG. 5, the O-RAN architecture may include a CU 510 that communicates with a core network 520 via a backhaul link. Furthermore, the CU 510 may communicate with one or more DUs 530 via respective midhaul links. The DUs 530 may each communicate with one or more RUs 540 via respective fronthaul links, and the RUs 540 may each communicate with respective UEs 120 via radio frequency (RF) access links. The DUs 530 and the RUs 540 may also be referred to as O-RAN DUs (O-DUs) 530 and O-RAN RUs (O-RUs) 540, respectively. RUs 540 may include RRHs.

In some aspects, the DUs 530 and the RUs 540 may be implemented according to a functional split architecture in which functionality of a base station 110 (e.g., an eNB or a gNB) is provided by a DU 530 and one or more RUs 540 that communicate over a fronthaul link. Accordingly, as described herein, a base station 110 may include a DU 530 and one or more RUs 540 that may be co-located or geographically distributed. In some aspects, the DU 530 and the associated RU(s) 540 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 530 may correspond to a logical unit that includes one or more base station functions to control the operation of one or more RUs 540. For example, in some aspects, the DU 530 may host a RLC layer, a MAC layer, and one or more high physical (PHY) layers (e.g., forward error correction (FEC) encoding and decoding, scrambling, and/or modulation and demodulation) based at least in part on a lower layer functional split. Higher layer control functions, such as a PDCP, RRC, and/or service data adaptation protocol (SDAP), may be hosted by the CU 510. The RU(s) 540 controlled by a DU 530 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 540 handle all over the air (OTA) communication with a UE 120, and real-time and non-real-time aspects of control and user plane communication with the RU(s) 540 are controlled by the corresponding DU 530, which enables the DU(s) 530 and the CU 510 to be implemented in a cloud-based RAN architecture. O-RAN architecture may be deployed for HST scenarios, where multiple RUs (RRHs) are deployed alongside a track on which the HST travels.

As indicated above, FIG. 5 is provided as an example. Other examples may differ from what is described with regard to FIG. 5.

Figure 6:
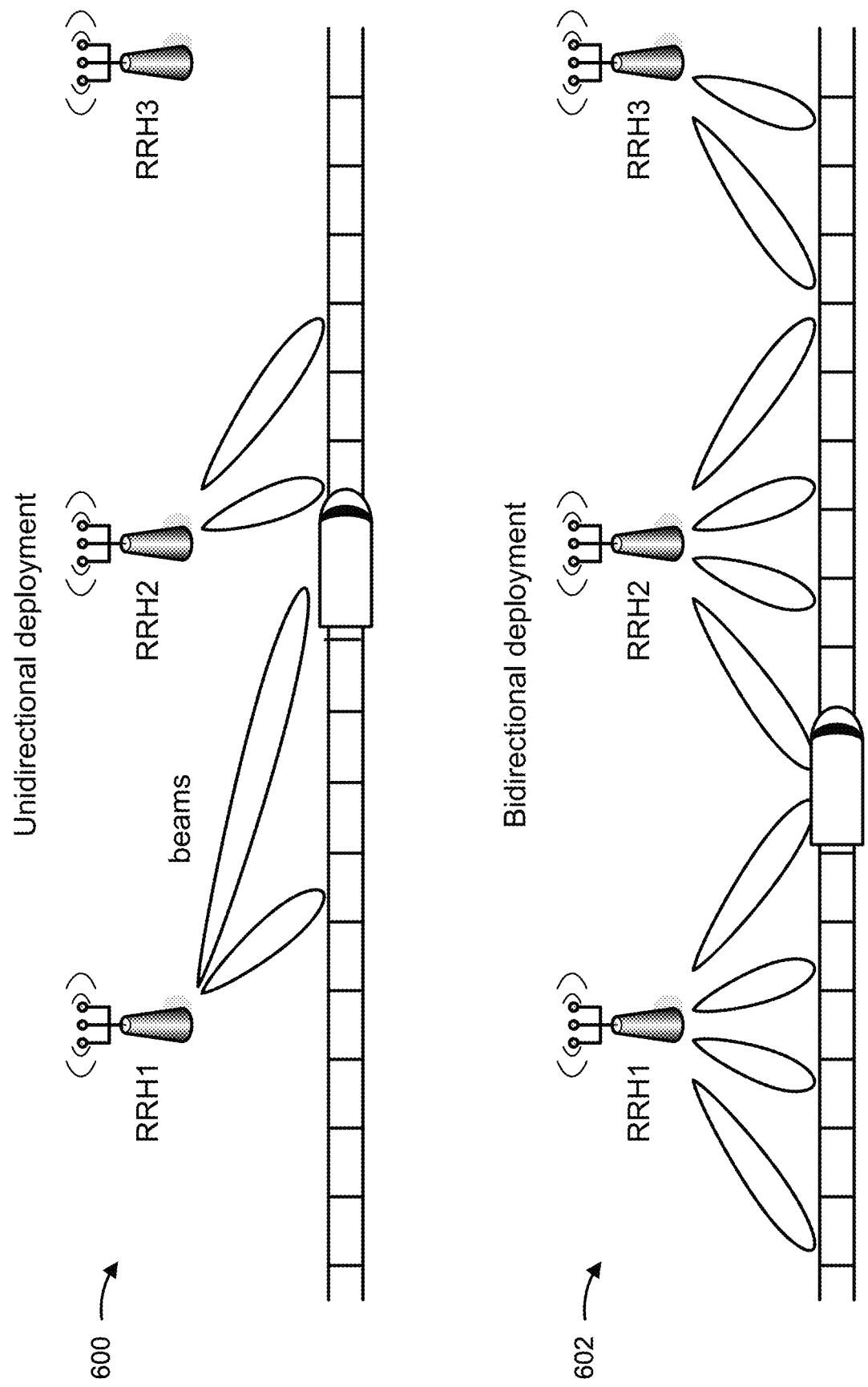
FIG. 6 is a diagram illustrating examples of remote radio head (RRH) deployments along a track for a high speed train, in accordance with the present disclosure.

FIG. 6 is a diagram illustrating examples 600 and 602 of RRH deployments along a track for a HST, in accordance with the present disclosure. A base station (e.g., base station 110) may be associated with (e.g., control) RRH1, RRH2, and RRH3, which are deployed alongside the track in a direction of travel of the HST. Each RRH may transmit different beams pointed in different directions, such as for SSBs or data transmissions. RRH1, RRH2, and RRH3 share the same cell ID. While examples 600 and 602 show examples of RRH deployments in a network for a HST scenario, RRHs may be deployed in other scenarios where the RRHs share the same cell ID.

Example 600 shows a unidirectional deployment in the network, where beams are transmitted in one direction. For example, each of the RRHs may transmit beams only in a direction in which the HST travels. Example 602 shows a bidirectional deployment in the network, where beams are transmitted in both a direction of the traveling HST and an opposite direction.

TCI states may switch for a UE (e.g., UE 120) traveling in the HST in an RRH deployment. Each RRH may have multiple TCI states for TCI state switching. TCI state switches may occur within a single RRH or across different RRHs. For example, the UE in the HST may switch TCI states across different RRHs by switching from a first TCI state for a serving RRH (RRH1) to a second TCI state for a next RRH (RRH2).

Because RRHs are in different physical locations, a propagation delay difference (timing offset change) can be large. Also, the two nearest RRHs to the HST are often an RRH in front of the HST and an RRH behind the HST. Therefore, when the UE switches TCI states from the RRH behind the HST to the RRH in front of the HST, the two TCI states can have a large Doppler shift difference (frequency offset change) due to the opposite relative moving directions. In other words, TCI state switches within an RRH may have a small timing change and/or a small frequency offset change, while TCI state switches across different RRHs may have a large timing change and/or a large frequency offset change.

In unidirectional deployments, TCI state switches across different RRHs may have a large timing change. In bidirectional deployments, TCI state switches across different RRHs may have a large frequency offset change. Because of the impact of the large timing or frequency offset changes, current algorithms for tracking the UE location and beam directions (TCI states) for the UE are not sufficient. In tracking of the UE is inaccurate, transmissions to and from the UE may degrade and cause the UE and the network to waste processing resources and signaling resources due to lost data and retransmissions.

As indicated above, FIG. 6 provides some examples. Other examples may differ from what is described with respect to FIG. 6.

Figure 7:
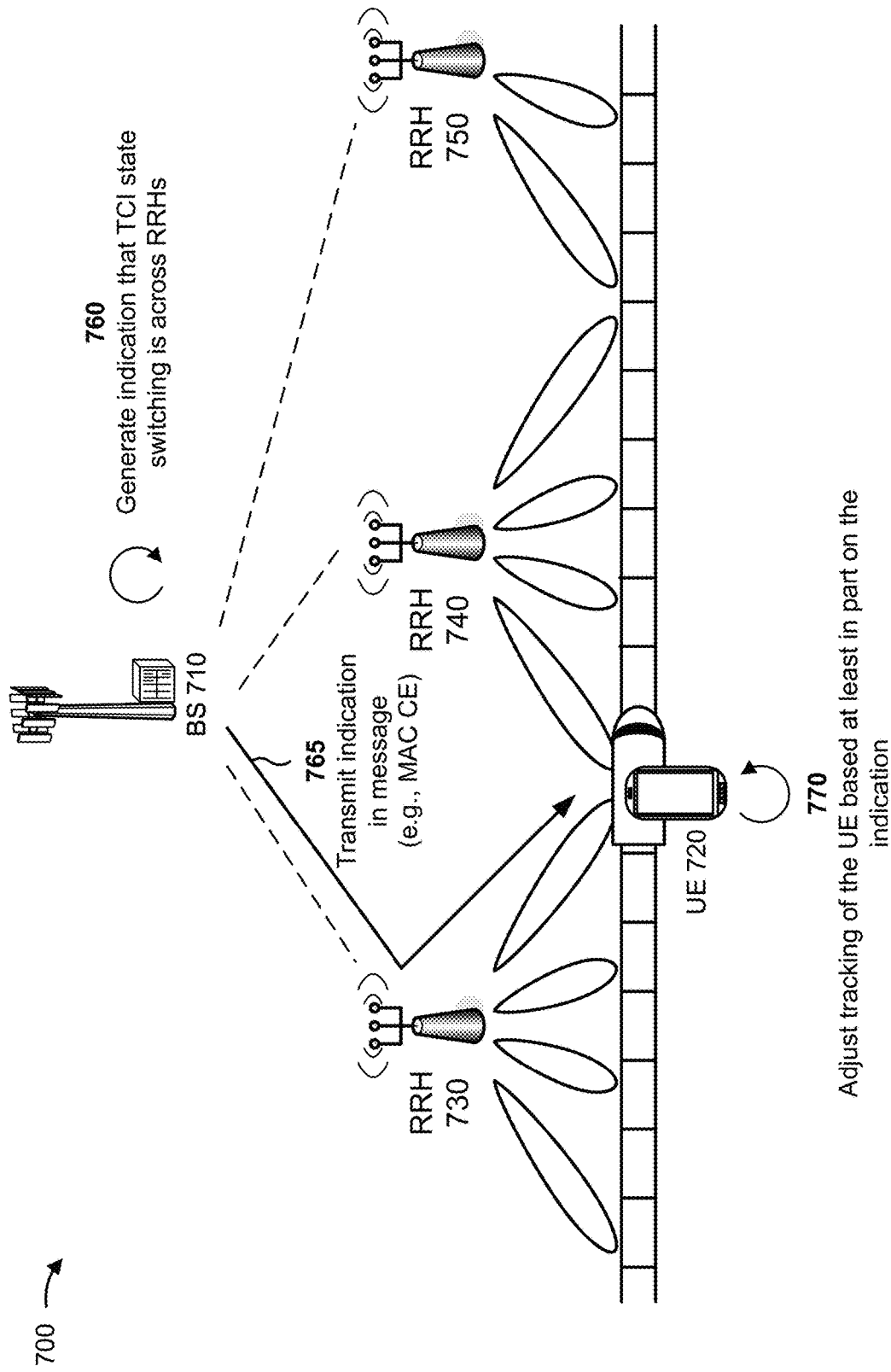
FIG. 7 is a diagram illustrating an example of indicating transmission configuration indicator state switching for RRHs, in accordance with the present disclosure.

FIG. 7 is a diagram illustrating an example 700 of indicating TCI state switching for RRHs, in accordance with the present disclosure. FIG. 7 shows a network entity, such as base station (BS) 710 (e.g., a base station 110), and a UE 720 (e.g., a UE 120) that may communicate with each other via multiple RRHs, such as RRH 730, RRH 740, and RRH 750. The RRHs may each transmit one or more beams, which may be single frequency network (SFN) beams. UE 720 may be on an HST passing the RRHs, and TCI state switching may involve frequencies in FR2.

Network signaling may help the UE 720 to identify TCI state switches that require different tracking algorithms for timing changes or frequency offset changes, including TCI state switches across RRHs. TCI state switching across RRHs is not the type of TCI state switching that is expected.

According to various aspects described herein, the BS 710 may transmit a message, such as a MAC control element (MAC CE) to the UE 720. that indicates whether the TCI state switching is within an RRH or across RRHs. For example, the BS 710 may generate the indication, as shown by reference number 760. The indication may be a flag, bit, or field that indicates the type of TCI state switching, such as a "1" for TCI state switching across RRHs, or a "0" (or no flag or bit) that indicates a regularly expected TCI state switching within an RRH. The UE 720 may transmit the indication in the message, as shown by reference number 765. The message may be transmitted via an RRH, such as RRH 730, or via another link.

If the TCI state switching is within an RRH, the UE 720 may use a tracking algorithm appropriate for TCI state switching within an RRH. If the TCI state switching is across RRHs, the UE 720 may adjust the tracking of the UE 720 to use a different reference signal or a different tracking algorithm appropriate for TCI state switching across RRHs, which may involve larger propagation delays and frequency changes. That is, as shown by reference number 770, the UE 720 may adjust a tracking algorithm for a timing offset change or a frequency offset change associated with the TCI switch being across the serving RRH 730 and the next RRH 740.

In some aspects, the UE 720 may adjust the tracking by using measurements of a reference signal associated with a new TCI state for the tracking based at least in part on the indication. The measurements may have been performed before the TCI state switch that the UE 720 is to use. The UE 720 may adjust the tracking with other a priori information.

In some aspects, the message may include information (e.g., flag, bit, field) that indicated a direction of the next RRH 740 with respect to a moving direction of the UE 720. This information may help the UE 720 to determine the direction of a frequency offset change and/or a timing offset change. For example, the UE 720 may reduce a timing offset if the next RRH 740 is in front of the UE 720 that is moving towards the next RRH 740, or increase the timing offset if the UE 720 is moving away from the next RRH 740. The UE 720 may reduce a frequency offset if the next RRH 740 is in front of the UE 720 that is moving towards the next RRH 740, or increase the frequency offset if the UE 720 is moving away from the next RRH 740. In some aspects, the information may indicate a range of values or an estimated value of a timing offset change or a frequency offset change for a TCI state switch.

RRH direction information may be helpful for when the UE 720 is directly across from an RRH. For example, if the UE 720 on the HST is between serving RRH 730 and the next RRH 740 (e.g., 2800 ms between each RRH), a beam from either RRH may serve the UE 720, and there may be a frequency offset. However, if the UE 720 is directly across from the next RRH 740 (e.g., within 800 ms), the next RRH 740 may be unable to transmit a beam to the UE 720 and it is the serving RRH 730 that may provide the beam to the UE 720. There may be both a frequency offset and a timing offset (due to the propagation delay from the serving RRH 730). The UE 720 may use the direction of an RRH to adjust the tracking appropriately. Adjusting the tracking may include adjusting the timing offset and/or the frequency offset in a tracking algorithm based at least in part on the direction of the next RRH 740.

In some aspects, the UE 720 may have information about the network deployment (e.g., unidirectional, bidirectional), where the information may have been received earlier in dedicated RRC signaling or in broadcast system information. The UE 720 may use the information about whether the network deployment of each RRH is unidirectional or bidirectional to adjust the tracking.

In some aspects, the UE 720 may have group information from the base station 710 as to a resource group of one or more of the RRHs. The UE 720 may adjust the tracking based at least in part on whether the serving RRH 730 is using resources in a different group than the next RRH 740. Even when reference resources for time and/or frequency and/or beam tracking belong to the same physical cell ID (PCI), those resources can be further grouped depending on whether or not a time offset and/or a frequency offset between the resources from different groups is larger than a specified amount (e.g., offset threshold). The specified amount may be different for different SSBs and/or tracking reference signal (TRS) subcarrier spacings.

When the UE 720 is configured with resources that can be used as reference resources for time-frequency tracking and/or Layer 1 (L1) measurements or reports, the group information may be provided in earlier signaling with a TCI state switch command. If the group information is not provided to the UE 720 during a resource configuration procedure or a TCI switching/activation procedure, the UE 720 may use the resources transmitted from the same RRH, such that time and/or frequency information obtained from one group can be used as coarse time and/or frequency information of the target reference resource (e.g. SSB, TRS). The group information may indicate whether the resources are transmitted from the same RRH.

By indicating that an upcoming TCI state switch is across RRHs, rather than within an RRH, the network may help the UE 720 to adjust a tracking of the UE 720 appropriate to the larger propagation delays or frequency offsets that are involved with a TCI state switch across RRHs. As a result, the beam coverage may be better and the base station 710, the RRHs, and the UE 720 may conserve processing resources and signaling resources that would otherwise be consumed with retransmissions and handling data loss.

As indicated above, FIG. 7 is provided as an example. Other examples may differ from what is described with respect to FIG. 7.

Figure 8:
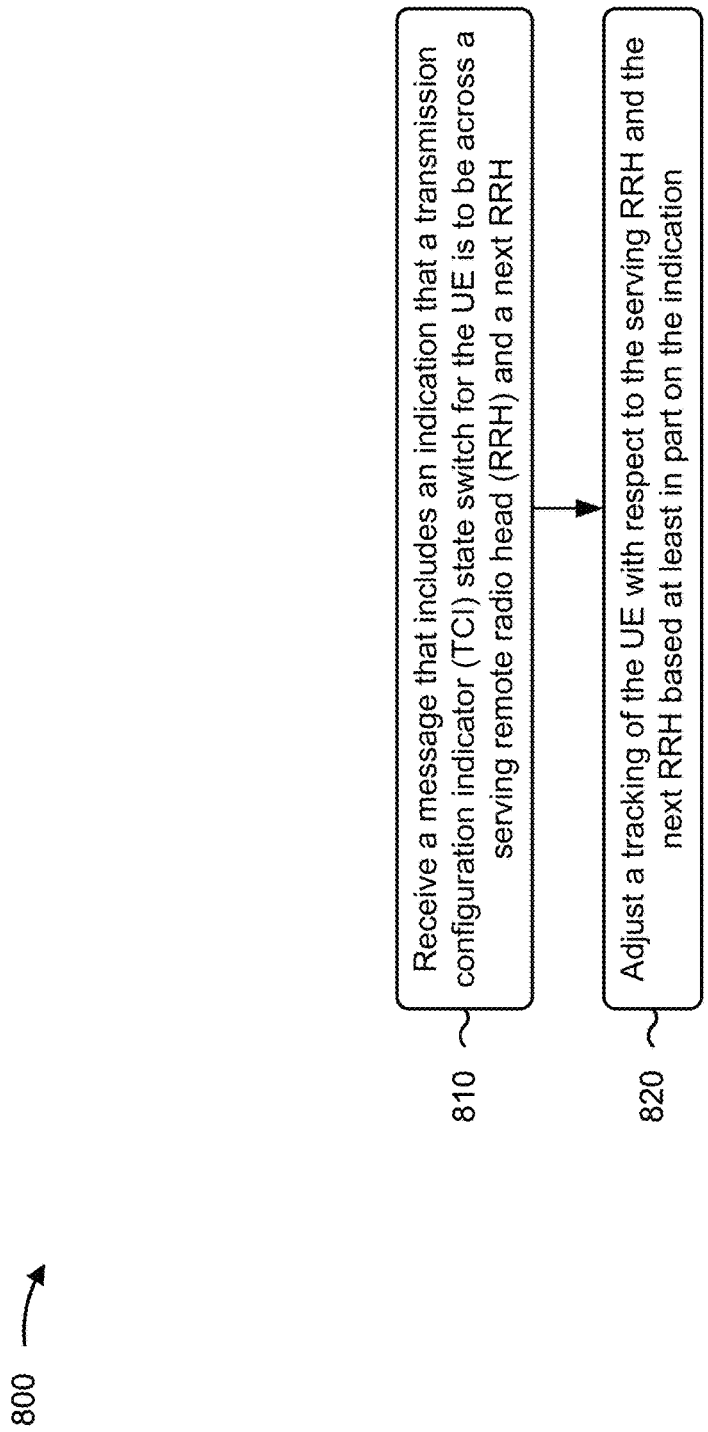
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., a UE 120, UE 720) performs operations associated with an indication of TCI state switching across RRHs.

As shown in FIG. 8, in some aspects, process 800 may include receiving a message that includes an indication that a TCI state switch for the UE is to be across a serving RRH and a next RRH (block 810). For example, the UE (e.g., using communication manager 140 and/or reception component 1002 depicted in FIG. 10) may receive a message that includes an indication that a TCI state switch for the UE is to be across a serving RRH and a next RRH, as described above.

As further shown in FIG. 8, in some aspects, process 800 may include adjusting a tracking of the UE with respect to the serving RRH and the next RRH based at least in part on the indication (block 820). For example, the UE (e.g., using communication manager 140 and/or tracking component 1008 depicted in FIG. 10) may adjust a tracking of the UE with respect to the serving RRH and the next RRH based at least in part on the indication, as described above.

Process 800 may include additional aspects, such as any single aspect or any combination of aspects described below and/or in connection with one or more other processes described elsewhere herein.

In a first aspect, adjusting the tracking includes adjusting a tracking algorithm for a timing offset change or a frequency offset change associated with the TCI switch being across the serving RRH and the next RRH.

In a second aspect, alone or in combination with the first aspect, adjusting the tracking includes selecting a different reference signal for the tracking than a current reference signal for the tracking based at least in part on the indication.

In a third aspect, alone or in combination with one or more of the first and second aspects, adjusting the tracking includes using measurements of a reference signal associated with a new TCI state for the tracking based at least in part on the indication, and the measurements are performed before the TCI state switch.

In a fourth aspect, alone or in combination with one or more of the first through third aspects, the message is a MAC CE.

In a fifth aspect, alone or in combination with one or more of the first through fourth aspects, the message includes information that indicates a direction of the next RRH with respect to a moving direction of the UE, and adjusting the tracking includes adjusting the tracking based at least in part on the direction.

In a sixth aspect, alone or in combination with one or more of the first through fifth aspects, the message includes information that indicates a range or an estimated value of a timing offset change or a frequency offset change, and adjusting the tracking includes adjusting the tracking based at least in part on the range or the estimated value of the timing offset change or the frequency offset change.

In a seventh aspect, alone or in combination with one or more of the first through sixth aspects, process 800 includes receiving information that indicates a unidirectional deployment or a bidirectional deployment of RRHs in a network, and adjusting the tracking includes adjusting the tracking based at least in part on the unidirectional deployment or the bidirectional deployment.

In an eighth aspect, alone or in combination with one or more of the first through seventh aspects, adjusting the tracking includes adjusting the tracking based at least in part on a resource group of the serving RRH being different than a resource group of the next RRH.

In a ninth aspect, alone or in combination with one or more of the first through eighth aspects, the UE is configured for TCI state switching in FR2 on an HST on a track with RRHs deployed alongside the track.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
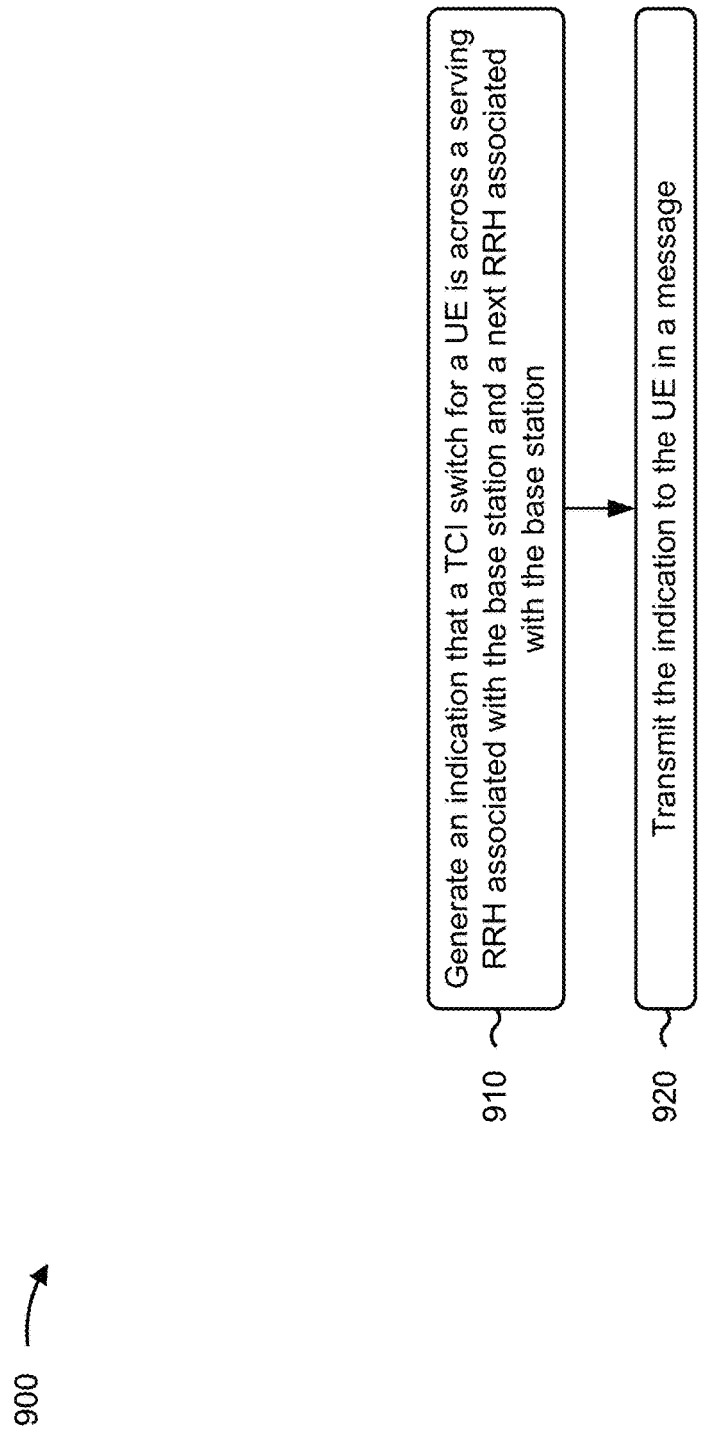
FIG. 9 is a diagram illustrating an example process performed, for example, by a network entity, in accordance with the present disclosure.

FIG. 9 is a diagram illustrating an example process 900 performed, for example, by a network entity, in accordance with the present disclosure. Example process 900 is an example where the network entity (e.g., a base station 110, BS 710) performs operations associated with providing an indication of TCI state switching across RRHs.

As shown in FIG. 9, in some aspects, process 900 may include generating an indication that a TCI switch for a UE is across a serving RRH associated with the network entity and a next RRH associated with the network entity (block 910). For example, the network entity (e.g., using communication manager 150 and/or generation component 1108 depicted in FIG. 11) may generate an indication that a TCI switch for a UE is across a serving RRH associated with the network entity and a next RRH associated with the network entity, as described above.

As further shown in FIG. 9, in some aspects, process 900 may include transmitting the indication to the UE in a message (block 920). For example, the network entity (e.g., using communication manager 150 and/or transmission component 1104 depicted in FIG. 11) may transmit the indication to the UE in a message, as described above.

Process 900 may include additional aspects, such as any single aspect or any combination of aspects described below and/or in connection with one or more other processes described elsewhere herein.

In a first aspect, the message is a MAC CE.

In a second aspect, alone or in combination with the first aspect, the message includes information that indicates a direction of the next RRH with respect to a moving direction of the UE.

In a third aspect, alone or in combination with one or more of the first and second aspects, the message includes information that indicates a range or an estimated value of a timing offset change or a frequency offset change.

In a fourth aspect, alone or in combination with one or more of the first through third aspects, process 900 includes transmitting information that indicates a unidirectional deployment or a bidirectional deployment of RRHs in a network.

In a fifth aspect, alone or in combination with one or more of the first through fourth aspects, the message includes resource group information for one or more of the serving RRH or the next RRH.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
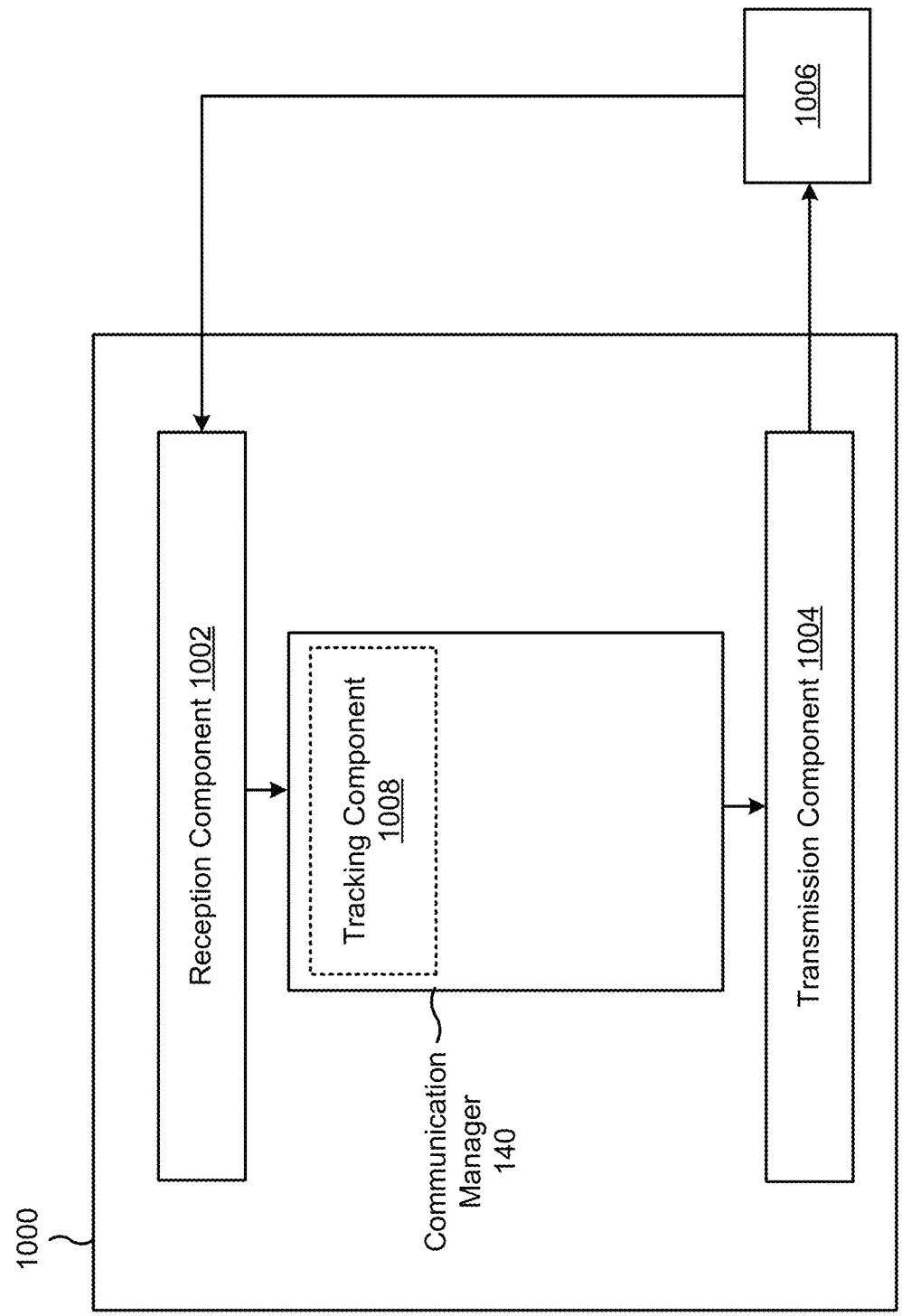
FIGS. 10-11 are diagrams of example apparatuses for wireless communication, in accordance with the present disclosure.

FIG. 10 is a diagram of an example apparatus 1000 for wireless communication. The apparatus 1000 may be a UE (e.g., a UE 120, UE 720), or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a network entity, a TRP, an RRH, or another wireless communication device) using the reception component 1002 and the transmission component 1004. As further shown, the apparatus 1000 may include the communication manager 140. The communication manager 140 may include a tracking component 1008, among other examples.

In some aspects, the apparatus 1000 may be configured to perform one or more operations described herein in connection with FIGS. 1-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive a message that includes an indication that a TCI state switch for the UE is to be across a serving RRH and a next RRH. The tracking component 1008 may adjust a tracking of the UE with respect to the serving RRH and the next RRH based at least in part on the indication.

The reception component 1002 may receive information that indicates a unidirectional deployment or a bidirectional deployment of RRHs in a network, and wherein adjusting the tracking includes adjusting the tracking based at least in part on the unidirectional deployment or the bidirectional deployment.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
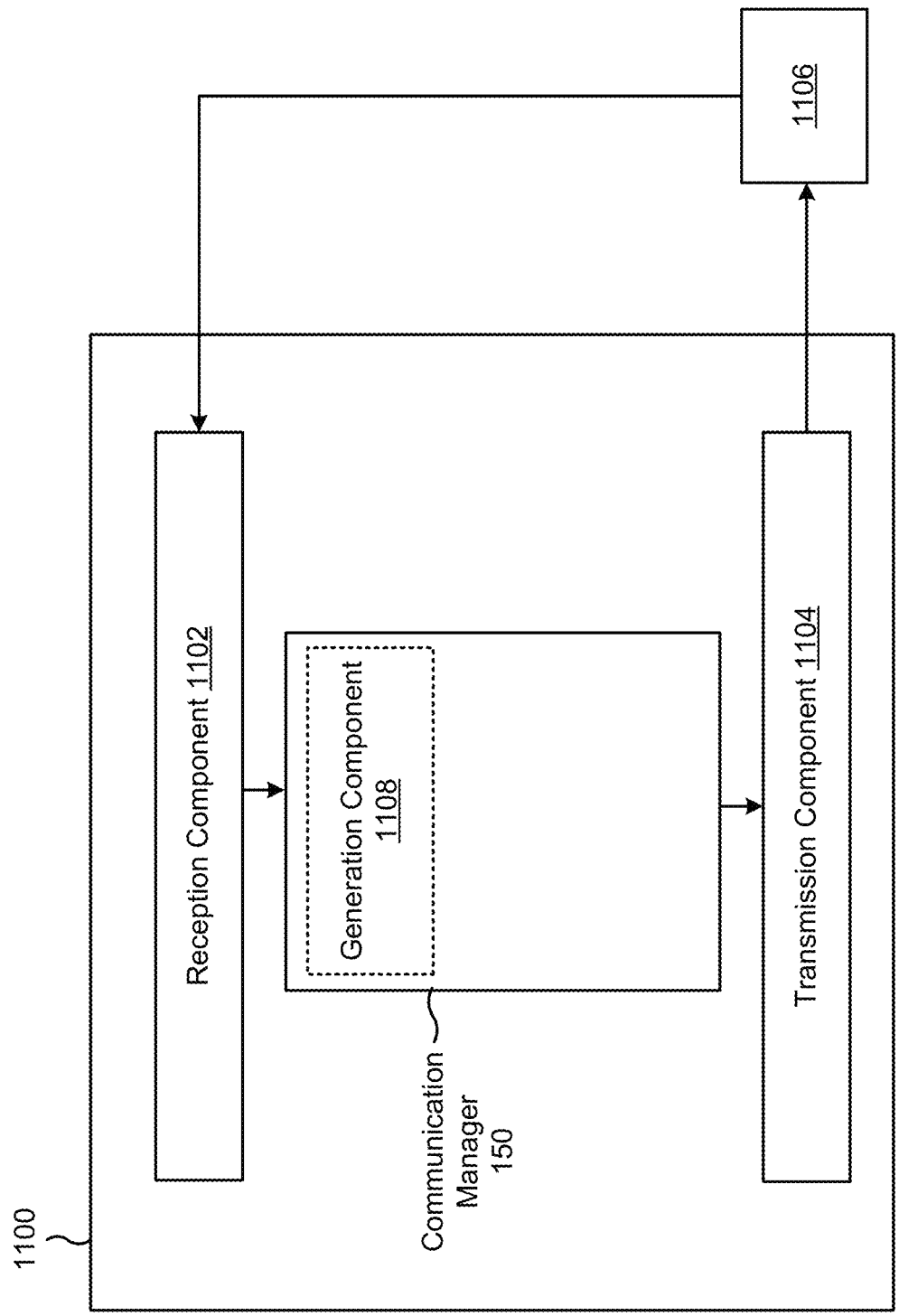

FIG. 11 is a diagram of an example apparatus 1100 for wireless communication. The apparatus 1100 may be a network entity (e.g., a base station 110, BS 710), or a network entity may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a network entity, or another wireless communication device) using the reception component 1102 and the transmission component 1104. As further shown, the apparatus 1100 may include the communication manager 150. The communication manager 150 may include a generation component 1108, among other examples.

In some aspects, the apparatus 1100 may be configured to perform one or more operations described herein in connection with FIGS. 1-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

The generation component 1108 may generate an indication that a TCI switch for a UE is across a serving RRH associated with the network entity and a next RRH associated with the network entity. The transmission component 1104 may transmit the indication to the UE in a message. The transmission component 1104 may transmit information that indicates a unidirectional deployment or a bidirectional deployment of RRHs in a network.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving a message that includes an indication that a transmission configuration indicator (TCI) state switch for the UE is to be across a serving remote radio head (RRH) and a next RRH; and adjusting a tracking of the UE with respect to the serving RRH and the next RRH based at least in part on the indication.

Aspect 2: The method of Aspect 1, wherein adjusting the tracking includes adjusting a tracking algorithm for a timing offset change or a frequency offset change associated with the TCI switch being across the serving RRH and the next RRH.

Aspect 3: The method of Aspect 1 or 2, wherein adjusting the tracking includes selecting a different reference signal for the tracking than a current reference signal for the tracking based at least in part on the indication.

Aspect 4: The method of any of Aspects 1-3, wherein adjusting the tracking includes using measurements of a reference signal associated with a new TCI state for the tracking based at least in part on the indication, and wherein the measurements are performed before the TCI state switch.

Aspect 5: The method of any of Aspects 1-4, wherein the message is a medium access control control element (MAC CE).

Aspect 6: The method of any of Aspects 1-5, wherein the message includes information that indicates a direction of the next RRH with respect to a moving direction of the UE, and wherein adjusting the tracking includes adjusting the tracking based at least in part on the direction.

Aspect 7: The method of any of Aspects 1-6, wherein the message includes information that indicates a range or an estimated value of a timing offset change or a frequency offset change, and wherein adjusting the tracking includes adjusting the tracking based at least in part on the range or the estimated value of the timing offset change or the frequency offset change.

Aspect 8: The method of any of Aspects 1-7, further comprising receiving information that indicates a unidirectional deployment or a bidirectional deployment of RRHs in a network, and wherein adjusting the tracking includes adjusting the tracking based at least in part on the unidirectional deployment or the bidirectional deployment.

Aspect 9: The method of any of Aspects 1-8, wherein adjusting the tracking includes adjusting the tracking based at least in part on a resource group of the serving RRH being different than a resource group of the next RRH.

Aspect 10: The method of any of Aspects 1-9, wherein the UE is configured for TCI state switching in frequency range 2 (FR2) on a high speed train on a track with RRHs deployed alongside the track.

Aspect 11: A method of wireless communication performed by a network entity, comprising: generating an indication that a transmission configuration indicator (TCI) switch for a user equipment (UE) is across a serving remote radio head (RRH) associated with the network entity and a next RRH associated with the network entity; and transmitting the indication to the UE in a message.

Aspect 12: The method of Aspect 11, wherein the message is a medium access control control element (MAC CE).

Aspect 13: The method of Aspect 11 or 12, wherein the message includes information that indicates a direction of the next RRH with respect to a moving direction of the UE.

Aspect 14: The method of any of Aspects 11-13, wherein the message includes information that indicates a range or an estimated value of a timing offset change or a frequency offset change.

Aspect 15: The method of any of Aspects 11-14, further comprising transmitting information that indicates a unidirectional deployment or a bidirectional deployment of RRHs in a network.

Aspect 16: The method of any of Aspects 11-15, wherein the message includes resource group information for one or more of the serving RRH or the next RRH.

Aspect 17: An apparatus for wireless communication at a device, comprising a processor; memory coupled with the processor; and instructions stored in the memory and executable by the processor to cause the apparatus to perform the method of one or more of Aspects 1-16.

Aspect 18: A device for wireless communication, comprising a memory and one or more processors coupled to the memory, the one or more processors configured to perform the method of one or more of Aspects 1-16.

Aspect 19: An apparatus for wireless communication, comprising at least one means for performing the method of one or more of Aspects 1-16.

Aspect 20: A non-transitory computer-readable medium storing code for wireless communication, the code comprising instructions executable by a processor to perform the method of one or more of Aspects 1-16.

Aspect 21: A non-transitory computer-readable medium storing a set of instructions for wireless communication, the set of instructions comprising one or more instructions that, when executed by one or more processors of a device, cause the device to perform the method of one or more of Aspects 1-16.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to cause the UE to:
   receive a message that includes an indication that an upcoming transmission configuration indicator (TCI) state switch for the UE is to be across remote radio heads (RRHs) rather than within an RRH, wherein the upcoming TCI state switch is to be across a serving RRH and a next RRH; and
   adjust a tracking of the UE with respect to the serving RRH and the next RRH based at least in part on the upcoming TCI state switch being across RRHs.

2. The UE of claim 1, wherein the one or more processors, to cause the UE to adjust the tracking, are configured to cause the UE to adjust a tracking algorithm for a timing offset change or a frequency offset change associated with the TCI switch being across the serving RRH and the next RRH.

3. The UE of claim 1, wherein the one or more processors, to cause the UE to adjust the tracking, are configured to cause the UE to select a different reference signal for the tracking than a current reference signal for the tracking based at least in part on the indication.

4. The UE of claim 1, wherein the one or more processors, to cause the UE to adjust the tracking, are configured to cause the UE to use measurements of a reference signal associated with a new TCI state for the tracking based at least in part on the indication, and wherein the measurements are performed before the upcoming TCI state switch.

5. The UE of claim 1, wherein the message is a medium access control control element (MAC CE).

6. The UE of claim 1, wherein the message includes information that indicates a direction of the next RRH with respect to a moving direction of the UE, and wherein the one or more processors, to adjust the tracking, are configured to adjust the tracking based at least in part on the direction.

7. The UE of claim 1, wherein the message includes information that indicates a range or an estimated value of a timing offset change or a frequency offset change, and wherein the one or more processors, to cause the UE to adjust the tracking, are configured to cause the UE to adjust the tracking based at least in part on the range or the estimated value of the timing offset change or the frequency offset change.

8. The UE of claim 1, wherein the one or more processors are configured to cause the UE to receive information that indicates a unidirectional deployment or a bidirectional deployment of RRHs in a network, and wherein the one or more processors, to cause the UE to adjust the tracking, are configured to cause the UE to adjust the tracking based at least in part on the unidirectional deployment or the bidirectional deployment.

9. The UE of claim 1, wherein the one or more processors, to cause the UE to adjust the tracking, are configured to cause the UE to adjust the tracking based at least in part on a resource group of the serving RRH being different than a resource group of the next RRH.

10. The UE of claim 1, wherein the UE is configured for TCI state switching in frequency range 2 (FR2) on a high speed train on a track with RRHs deployed alongside the track.

11. A method of wireless communication performed by a user equipment (UE), comprising:
    receiving a message that includes an indication that an upcoming transmission configuration indicator (TCI) state switch for the UE is to be across remote radio heads (RRHs) rather than within an RRH, wherein the upcoming TCI state switch is to be across a serving remote radio head (RRH) RRH and a next RRH; and
    adjusting a tracking of the UE with respect to the serving RRH and the next RRH based at least in part on the upcoming TCI state switch being across RRHs.

12. The method of claim 11, wherein adjusting the tracking includes adjusting a tracking algorithm for a timing offset change or a frequency offset change associated with the TCI switch being across the serving RRH and the next RRH.

13. The method of claim 11, wherein adjusting the tracking includes selecting a different reference signal for the tracking than a current reference signal for the tracking based at least in part on the indication.

14. The method of claim 11, wherein adjusting the tracking includes using measurements of a reference signal associated with a new TCI state for the tracking based at least in part on the indication, and wherein the measurements are performed before the upcoming TCI state switch.

15. The method of claim 11, wherein the message includes information that indicates a direction of the next RRH with respect to a moving direction of the UE, and wherein adjusting the tracking includes adjusting the tracking based at least in part on the direction.

16. The method of claim 11, wherein the message includes information that indicates a range or an estimated value of a timing offset change or a frequency offset change, and wherein adjusting the tracking includes adjusting the tracking based at least in part on the range or the estimated value of the timing offset change or the frequency offset change.

17. The method of claim 11, further comprising receiving information that indicates a unidirectional deployment or a bidirectional deployment of RRHs in a network, and wherein adjusting the tracking includes adjusting the tracking based at least in part on the unidirectional deployment or the bidirectional deployment.

18. The method of claim 11, wherein adjusting the tracking includes adjusting the tracking based at least in part on a resource group of the serving RRH being different than a resource group of the next RRH.

19. The method of claim 11, wherein the UE is configured for TCI state switching in frequency range 2 (FR2) on a high speed train on a track with RRHs deployed alongside the track.

20. A non-transitory computer-readable medium storing a set of instructions for wireless communication, the set of instructions comprising:
one or more instructions that, when executed by one or more processors of a user equipment (UE), cause the UE to:
receive a message that includes an indication that an upcoming transmission configuration indicator (TCI) state switch for the UE is to be across remote radio heads (RRHs) rather than within an RRH, wherein the upcoming TCI state switch is to be across a serving RRH and a next RRH; and
adjust a tracking of the UE with respect to the serving RRH and the next RRH based at least in part on the upcoming TCI state switch being across RRHs.

21. The non-transitory computer-readable medium of claim 20, wherein the one or more instructions that cause the UE to adjust the tracking further cause the UE to:
adjust a tracking algorithm for a timing offset change or a frequency offset change associated with the TCI switch being across the serving RRH and the next RRH.

22. The non-transitory computer-readable medium of claim 20, wherein the one or more instructions that cause the UE to adjust the tracking further cause the UE to:
select a different reference signal for the tracking than a current reference signal for the tracking based at least in part on the indication.

23. The non-transitory computer-readable medium of claim 20, wherein the one or more instructions that cause the UE to adjust the tracking further cause the UE to:
use measurements of a reference signal associated with a new TCI state for the tracking based at least in part on the indication, wherein the measurements are performed before the upcoming TCI state switch.

24. The non-transitory computer-readable medium of claim 20, wherein the message is a medium access control control element (MAC CE).

25. The non-transitory computer-readable medium of claim 20, wherein the message includes information that indicates a direction of the next RRH with respect to a moving direction of the UE, and wherein adjusting the tracking includes adjusting the tracking based at least in part on the direction.

26. The non-transitory computer-readable medium of claim 20, wherein the message includes information that indicates a range or an estimated value of a timing offset change or a frequency offset change, and wherein adjusting the tracking includes adjusting the tracking based at least in part on the range or the estimated value of the timing offset change or the frequency offset change.

27. The non-transitory computer-readable medium of claim 20, wherein:
the one or more instructions further cause the UE to receive information that indicates a unidirectional deployment or a bidirectional deployment of RRHs in a network; and
the one or more instructions that cause the UE to adjust the tracking further cause the UE to adjust the tracking based at least in part on the unidirectional deployment or the bidirectional deployment.

28. The non-transitory computer-readable medium of claim 20, wherein the one or more instructions that cause the UE to adjust the tracking, cause the UE to:
adjust the tracking based at least in part on a resource group of the serving RRH being different than a resource group of the next RRH.

29. An apparatus for wireless communication, comprising:
means for receiving a message that includes an indication that an upcoming transmission configuration indicator (TCI) state switch for the apparatus is to be across remote radio heads (RRHs) rather than within an RRH, wherein the upcoming TCI state switch is to be across a serving RRH and a next RRH; and
means for adjusting a tracking of the apparatus with respect to the serving RRH and the next RRH based at least in part on the upcoming TCI state switch being across RRHs.

30. The UE of claim 1, wherein:
the indication indicates a type of the upcoming TCI state switch;
the type of the TCI state switch corresponds to a first type of TCI state switch that is across RRHs or a second type of TCI state switch that is within an RRH; and
the indication indicates that the type of the upcoming TCI state switch is the first type of TCI state switch.

* * * * *